US007989985B2

(12) United States Patent
Patel

(10) Patent No.: US 7,989,985 B2
(45) Date of Patent: Aug. 2, 2011

(54) METHOD AND SYSTEM TO STOP RETURN CURRENT FROM FLOWING INTO A DISCONNECTED POWER PORT OF A DUAL BATTERY POWERED DEVICE

(75) Inventor: Amrish Patel, Kanata (CA)

(73) Assignee: Ciena Corporation, Linthicum, MD (US)

( * ) Notice: Subject to any disclaimer, the term of this patent is extended or adjusted under 35 U.S.C. 154(b) by 295 days.

(21) Appl. No.: 12/415,047

(22) Filed: Mar. 31, 2009

(65) Prior Publication Data

US 2009/0322161 A1 Dec. 31, 2009

Related U.S. Application Data

(60) Provisional application No. 61/075,894, filed on Jun. 26, 2008.

(51) Int. Cl.
 *H02J 1/00* (2006.01)
 *H01H 83/00* (2006.01)
(52) U.S. Cl. ........................................ 307/86; 307/127
(58) Field of Classification Search .................... 307/86, 307/125, 127; 320/134, 164; 327/29
 See application file for complete search history.

(56) References Cited

U.S. PATENT DOCUMENTS

| 3,659,183 | A | * | 4/1972 | Carlson | 320/105 |
|-----------|---|---|--------|---------|---------|
| 4,045,769 | A | * | 8/1977 | Faller | 340/469 |
| 4,827,267 | A | * | 5/1989 | Shearin | 342/201 |
| 5,731,690 | A | * | 3/1998 | Taniquchi et al. | 322/28 |
| 6,278,201 | B1 | * | 8/2001 | Brien et al. | 307/62 |
| 6,326,772 | B2 | * | 12/2001 | Kusumoto et al. | 320/166 |
| 7,281,141 | B2 | * | 10/2007 | Elkayam et al. | 713/300 |

* cited by examiner

*Primary Examiner* — Albert W Paladini
(74) *Attorney, Agent, or Firm* — Christopher & Weisberg, P.A.

(57) ABSTRACT

A battery return disconnect ("BRD") circuit for use with a battery supply having a plurality of electrically parallel interconnecting batteries. The BRD circuit includes a plurality of DC input ports, a set of OR-ing diodes, a plurality of polarity detectors and a plurality of switches. Each input port includes a DC input terminal and a DC return terminal. Each OR-ing diode is connected to a DC input terminal or a DC return terminal and is forward-biased to when the BRD circuit is connected to a plurality of batteries having substantially the same voltage level. Each polarity detector monitors the bias of an OR-ing diode electrically connected to a corresponding DC input terminal. Each switch is connected to a DC return terminal and a polarity detector. Each switch is closed as long as the monitored OR-ing diode is forward-biased and open when the monitored OR-ing diode is reverse-biased.

20 Claims, 6 Drawing Sheets

METHOD AND SYSTEM TO STOP RETURN CURRENT FROM FLOWING INTO A DISCONNECTED POWER PORT OF A DUAL BATTERY POWERED DEVICE

CROSS-REFERENCE TO RELATED APPLICATION

The present invention is related to and claims priority to U.S. Provisional Patent Application No. 61/075,894, filed Jun. 26, 2008, entitled "BATTERY RETURN DISCONNECT: SOLUTION TO STOP RETURN CURRENT FLOWING INTO DISCONNECTED POWER PORT OF AN NE POWERED BY DUAL BATTERY PLANT," the entire contents of which is incorporated herein by reference.

STATEMENT REGARDING FEDERALLY SPONSORED RESEARCH OR DEVELOPMENT n/a

FIELD OF THE INVENTION

The present invention relates generally to a battery disconnect switch, and more specifically to a solid state disconnect switch to prevent excessive current on battery return leads of a network element powered by a dual battery supply.

BACKGROUND OF THE INVENTION

The telecommunication industry provides customers with constant, around the clock access to communication services. Downtime is not permitted or tolerated in this industry. As such, most communication systems require some form of redundancy for all or most of the underlying equipment and components. The actual power supply and back-up power supply is no exception. Thus, many telecom and/or networking equipment are required to operate from a dual back-up battery or power supply (as referred to as a "plant").

An example of a prior art telecommunication device 10 is shown in FIG. 1. Telecommunication device 10 includes a network element 12 connected to dual back-up batteries 14a, 14b (collectively referenced as dual batteries 14). The dual batteries 14 are connected in a parallel circuit configuration, with each input feeding into one of four "OR-ing" diodes 16a, 16b, 16c and 16d (collectively referenced as OR-ing diodes 16). The OR-ing diodes 16 conduct current in the forward direction and prevent the flow of return current back through the dual batteries 14. Current flows through the circuit in the direction indicated by arrows in FIG. 1. Current flowing from the positive terminals is indicated by solid arrowheads, while current flowing into the negative terminals is indicated as a line arrowhead.

The dual batteries 14 supply power to DC/DC converters 18 and transfer this energy to other components (not shown) of the network element 12. The dual batteries 16 are connected to the building ground 20 via a "vertical riser" 22. The vertical riser 22 is generally a cable, around 750 cm in length, connecting the positive terminals of each battery 14 to each other, to building ground 20 and to the chassis ground 24 of the network element 12. When both batteries are connected and working properly, i.e., at virtually the same voltage level, both the vertical riser 22 and the chassis ground 20, ideally, should carry virtually no current due to a balanced distribution of current flow in all feeds and returns. In other words, the currents flowing through the vertical riser 22 from the positive terminals of the batteries 14 are of equal magnitude and in opposite directions, thereby, effectively cancelling each other out and allowing no current to flow. Minor imbalances, if any, are due to slight resistance deltas in feeders, junctions, taps and the voltage and/or current properties of diodes.

Although the current load through ground is negated when both batteries 14 are connected and working properly, problems arise when one battery becomes disconnected or suffers a capacity/stored voltage loss. For example, as shown in the block diagram of FIG. 2, if the negative terminal of battery 14a is disconnected, then no current flows from the positive terminal of battery 14a to offset the current from the positive terminal of battery 14b. Thus, a direct path to building ground is established from the positive terminal of battery 14b through the vertical riser 22. The vertical riser 22 current may be up to half of the total plant current, if all network elements are powered off the same set of dual back-up batteries, and may exceed the rating of the vertical riser cable. The vertical riser 22 is generally not rated high enough to support this excess current and can potentially cause overheating of the cable. A similar problem is also created when the batteries 14 are not at the same voltage level, reverse biasing (i.e., disconnecting) one of the OR-ing diodes 16 causing excessive current to flow into the vertical riser 22.

Therefore, what is needed is a battery return disconnect switch for network elements powered by a dual battery supply that prevents an excess current from affecting the building ground.

SUMMARY OF THE INVENTION

The present invention advantageously provides a method and system for preventing return current from flowing into a disconnected power port of a device powered by a dual battery. The present invention also prevents current from flowing through a return port when the battery connected to the return port is at a substantially lower voltage than the other battery.

In accordance with one aspect of the present invention, a battery return disconnect circuit is provided for use with a battery supply having a plurality of electrically parallel interconnecting batteries. The battery return disconnect circuit includes a plurality of DC input ports, a set of OR-ing diodes, a plurality of polarity detectors, and a plurality of switches. Each DC input port is connectable to a corresponding one of the batteries. Each DC input port includes a DC input terminal and a DC return terminal. Each OR-ing diode of the set of OR-ing diodes is electrically connected in series with either a corresponding DC input terminal or a corresponding DC return terminal such that each OR-ing diode is forward-biased to conduct current when the battery return disconnect circuit is connected to the plurality of batteries and the batteries are at substantially the same voltage. Each polarity detector monitors the bias of an OR-ing diode electrically connected to a corresponding DC input terminal. Each switch is electrically connected in series with a DC return terminal and electrically coupled to a polarity detector. Each switch operates in a closed position when the corresponding polarity detector determines that its monitored OR-ing diode is forward-biased and operates in an open position when the corresponding polarity detector determines that its monitored OR-ing diode is reverse-biased.

In accordance with another aspect of the present invention, a fuse/breaker panel is provided for use with a battery supply having a plurality of electrically parallel interconnecting batteries. The fuse/breaker panel includes a plurality of DC input ports, either a plurality of breakers or a plurality of fuses, and a battery return disconnect circuit. Each DC input port is connectable to a corresponding one of the batteries. Each DC input port includes a DC input terminal and a DC return terminal. The plurality of breakers or the plurality of fuses is directly connected to the plurality of DC input ports. The battery return disconnect circuit is electrically connected to the plurality of DC input ports. The battery return disconnect circuit includes a set of OR-ing diodes, a plurality of polarity detectors, and a plurality of switches. Each OR-ing diode is electrically connected in series with either a corresponding DC input terminal and a corresponding DC return terminal such that each OR-ing diode is forward-biased to conduct current when the battery return disconnect circuit is connected to the plurality of batteries and the batteries are at substantially the same voltage level. Each polarity detector monitors the bias of an OR-ing diode electrically connected to a corresponding DC input terminal. Each switch is electrically connected in series with a DC return terminal and is electrically coupled to a polarity detector. Each switch operates in a closed position when the corresponding polarity detector determines that its monitored OR-ing diode is forward-biased and operates in an open position when the corresponding polarity detector determines that its monitored OR-ing diode is reverse-biased.

In accordance with yet another aspect of the present invention, a method is provided for preventing current flow through a DC return port of a device powered by a battery supply. The device has a plurality of DC input ports. Each DC input port is connectable to one of the batteries and each DC input port includes a DC input terminal and a DC return terminal. The battery supply has a plurality of electrically parallel interconnecting batteries. A battery return disconnect circuit is electrically connected between the battery supply and the plurality of DC input ports. The battery disconnect circuit includes a set of OR-ing diodes electrically connected to a corresponding DC input terminal, a plurality of polarity detectors, and a plurality of switches electrically connected to a corresponding DC input terminal. A bias of an OR-ing diode electrically connected to a corresponding DC input terminal is monitored. IF the monitored OR-ing diode is reverse-biased, one of the switches electrically connected to a corresponding DC return terminal is switched to an open position.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
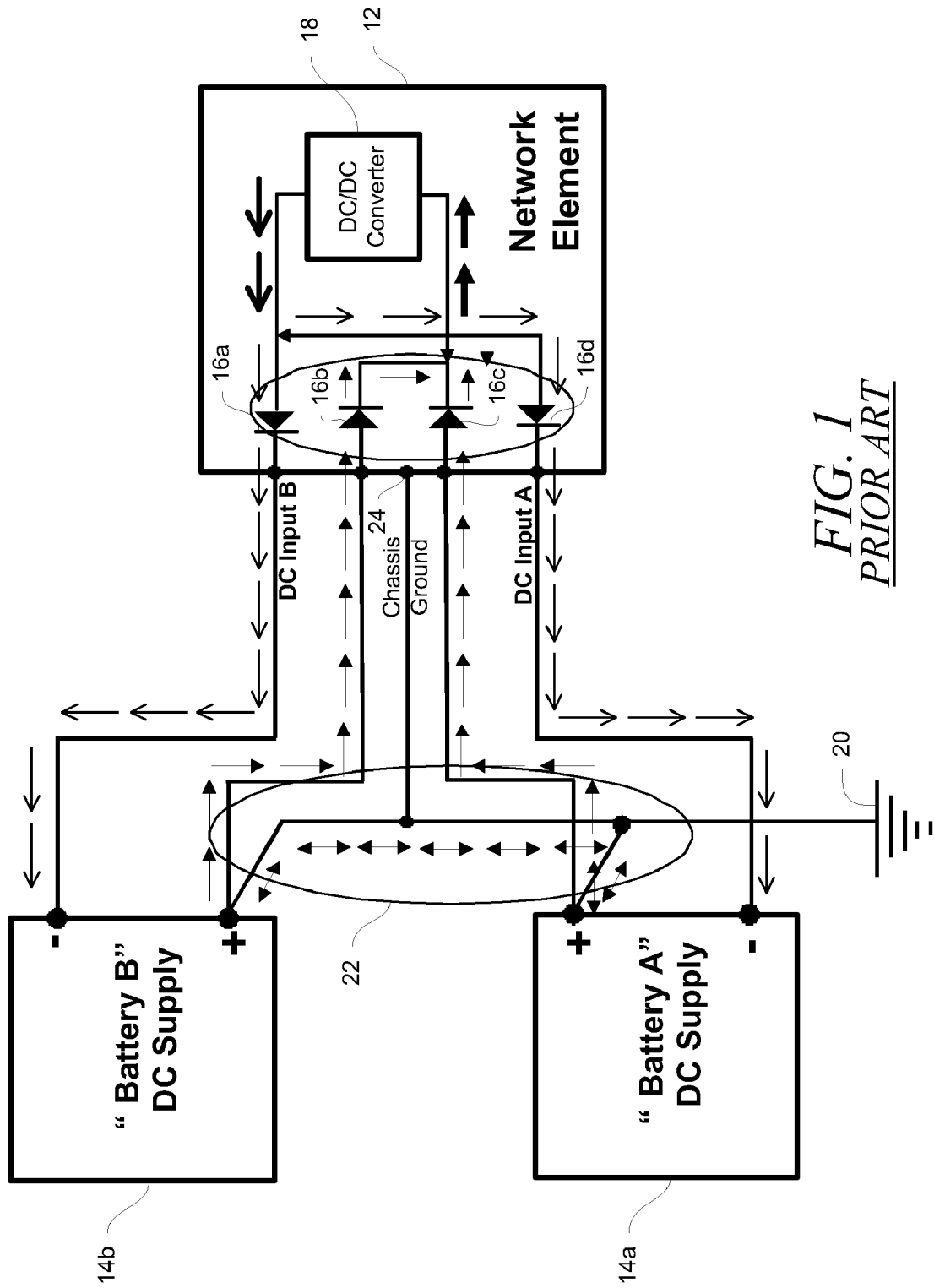
FIG. 1 is a block diagram of a prior art telecommunication device powered by dual batteries.
Figure 2:
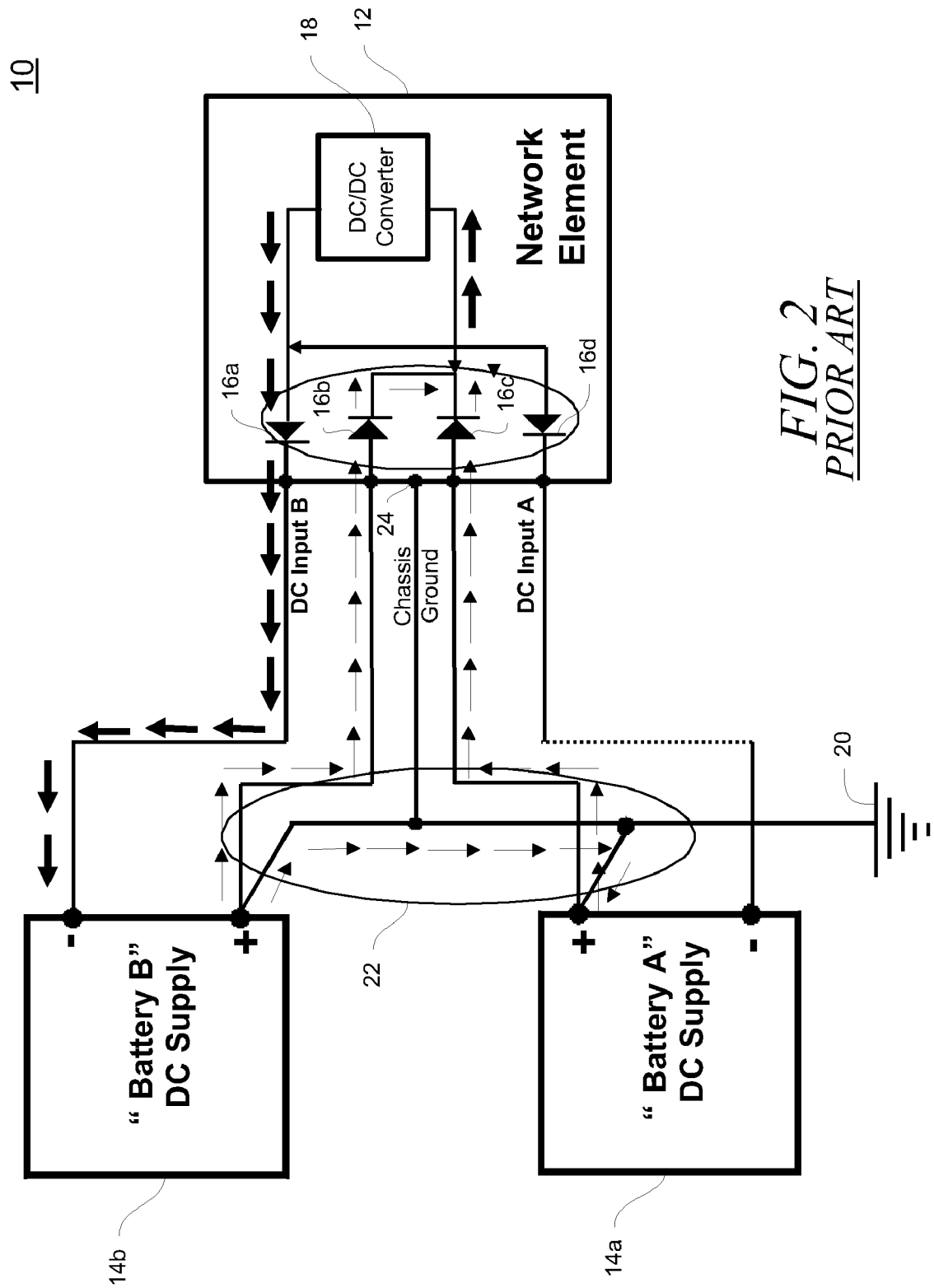
FIG. 2 is a block diagram of a prior art telecommunication device powered by dual batteries, illustrating the flow of return current though ground when one battery is disconnected or operating at a lower voltage relative to the other battery.

Before describing in detail exemplary embodiments that are in accordance with the present invention, it is noted that the embodiments reside primarily in combinations of apparatus components and processing steps related to implementing a system and method for battery return disconnect switch for network elements powered by a dual battery supply that prevents an excess current from affecting the building's vertical riser and ground when one battery is disconnected or the batteries are at unequal voltage levels. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

One embodiment of the present invention advantageously provides a battery return disconnect that eliminates current flow in the vertical riser of a dual battery system. The battery return disconnect effectively eliminates vertical riser current when one battery is disconnected, as well as when the batteries operate at different voltage levels.

Figure 3:
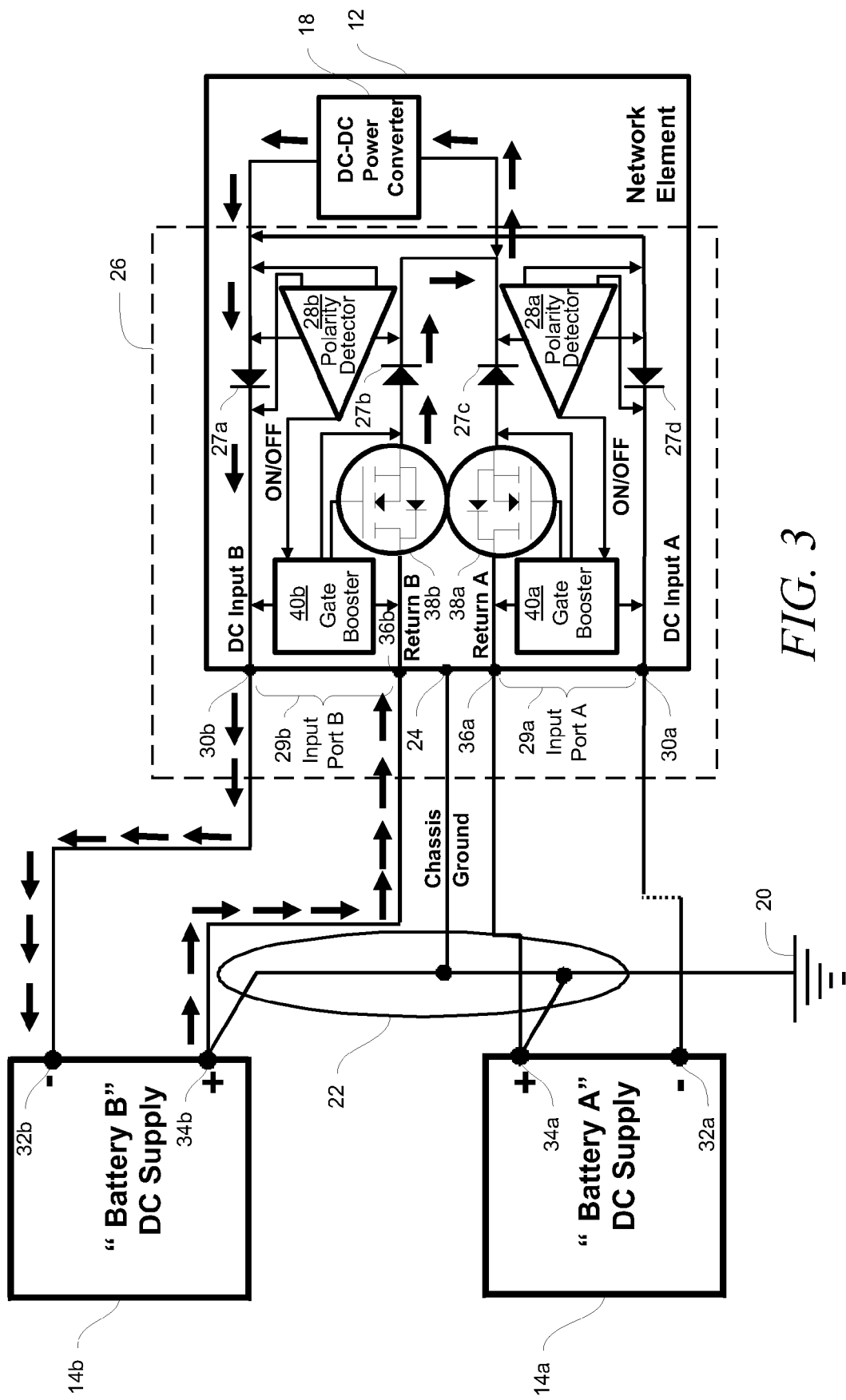
FIG. 3 is a block diagram of an exemplary battery return disconnect ("BRD") circuit constructed in accordance with the principles of the present invention.

Referring now to the drawing figures in which like reference designators refer to like elements, there is shown in FIG. 3, a battery return disconnect circuit 26 provided in accordance with the principles of the present invention. Battery return disconnect circuit 26 is a solid state switch that may be integrated inside a network element 12, as shown in FIG. 3, or may be an external "stand-alone" device such as a rack mountable fuse/breaker panel. The network element 12 is powered by a dual battery plant 14 connected to each other and to building ground 20 through a vertical riser 22. The batteries 14 are connected in an electrically parallel relationship, such that, in theory, if one of the batteries 14 should fail, the second battery 14 is able to power the network element 12 alone. The battery return disconnect circuit 26 is normally "ON" and turns "OFF" whenever it detects a disconnected power feed or a reversed feed OR-ing diode 27, indicating that one of the power plants 14 is at a lower voltage than the other. The battery return disconnect circuit 26 automatically turns back on whenever the disconnected feed is reconnected and both feeds are on and carrying current.

The battery return disconnect circuit 26 includes a pair of polarity detectors 28a, 28b (referenced collectively as polarity detector 28), and a pair of DC input ports 29a, 29b (referenced collectively as DC input port 29). Each DC input port 29 includes an input terminal 30 and a DC return terminal 36. Each polarity detector 28 may be implemented as an op-amp comparator whose inputs are connected across an OR-ing diode 27a, 27d that is in series with an input terminal 30a, 30b of the battery return disconnect circuit 26. Each input terminal 30a, 30b is connected to a negative terminal 32a, 32b of one of the batteries 14. The positive terminal 34a, 34b of each battery 14 is connected to a DC return terminal 36a, 36b of the battery return disconnect circuit 26, as well as connected to each other through a vertical riser 22 connected to building ground 20 and chassis ground 24. Each DC return 36 is connected to an N-channel metal-oxide-semiconductor field-effect transistor ("MOSFET") 38a, 38b configured as a switch, which conducts current when both batteries 14 are connected across the DC inputs 30 and DC returns 36, or when the battery connected across the corresponding DC input 30 and DC return 36 is at the same or higher voltage level than a battery connected across the other DC input 30 and DC return 36. In order to reverse bias the OR-ing diode 27a, 27d and turn off the battery return disconnect, the voltage difference between the two batteries 12 should be greater than the "On" voltage of the OR-ing diode 27.

The polarity detectors 28 detect when the corresponding input feed 30 is off, i.e. the negative battery terminal 32 is disconnected, or has a lower voltage than the other battery 14. In other words, a polarity detector 28 is activated when the corresponding OR-ing diode 27 is reverse biased. When the polarity detector 28 is activated, its output triggers a gate booster 40a, 40b to switch the corresponding MOSFET 38 off, thereby opening the circuit path and preventing any current from flowing out the return 36. The gate booster 40 boosts the gate voltage of the corresponding MOSFET 38 above the source voltage in order to fully turn on the MOSFET 38 with minimum drain-to-source resistance. The polarity detector 28 turns off the gate booster 40, and hence, the MOSFET 38, when it detects a reverse bias across the OR-ing diode 27. N-channel MOSFETs are preferred for use as the BRD switch, as opposed to P-channel MOSFETs, to minimize "ON" resistance and improve power dissipation. Other switching devices, such as P-channel MOSFETs, junction field effect transistors ("JFETs"), bipolar junction transistors ("BJTs"), silicon-controlled rectifiers ("SCR"), etc. may be used in place of the N-channel MOSFETs; however, these devices may be more complex to implement and dissipate significantly more power than an N-channel MOSFET. Referring to the scenario depicted in FIG. 3, wherein the negative terminal 32a of battery 14a is disconnected, polarity detector 28a detects that OR-ing diode 27d is reverse-biased, i.e., the voltage drop across the OR-ing diode 27d is less than the forward "on" voltage of the diode, activating the output of the polarity detector 28a, and enabling the gate booster 40a to "turn off" MOSFET 38a, thereby preventing current flow through the return 36a. Thus, no current flows in the vertical riser 22.

Figure 4:
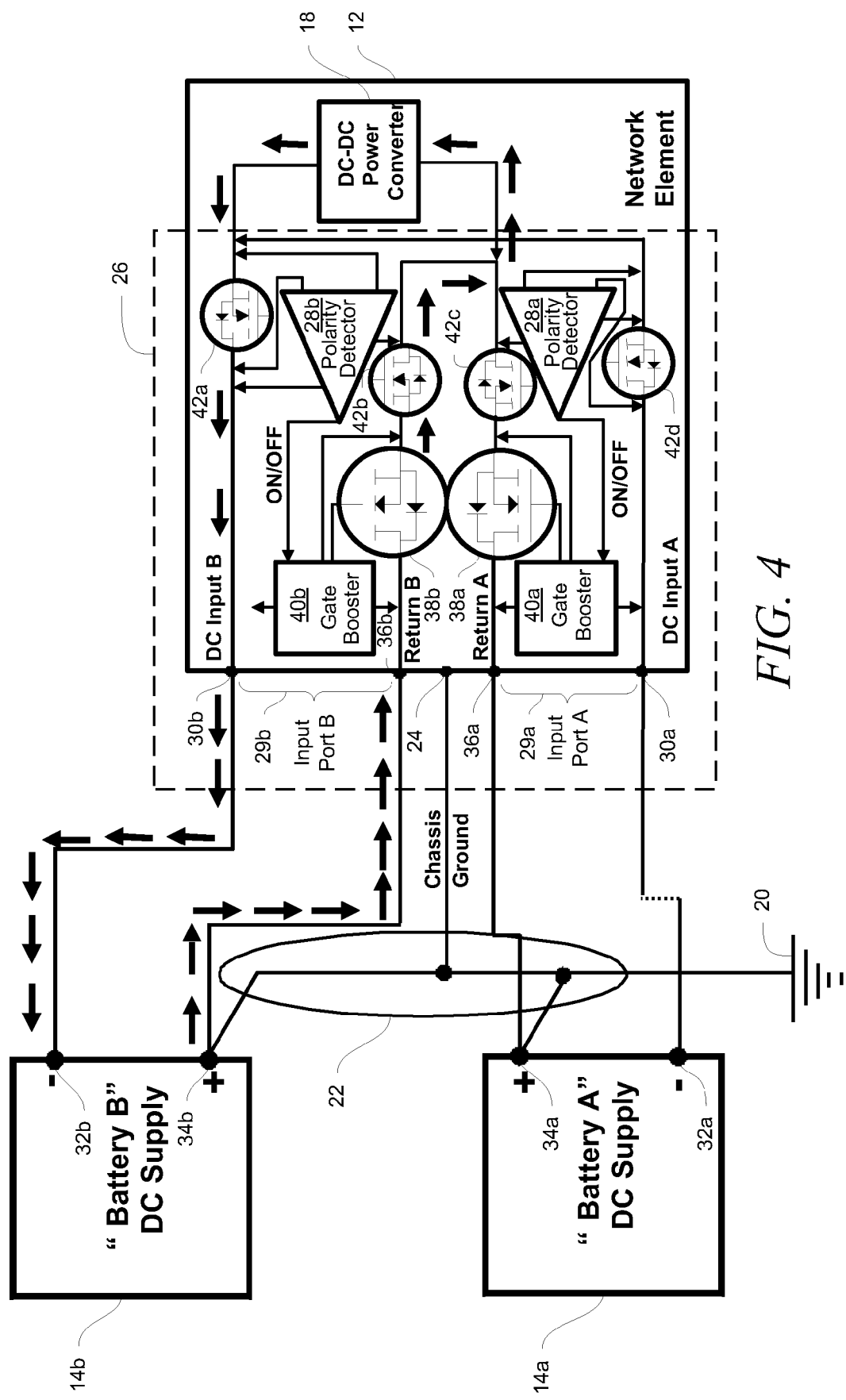
FIG. 4 is a block diagram of an exemplary BRD circuit with active OR-ing diodes, constructed in accordance with the principles of the present invention.

Referring now to FIG. 4, an alternative embodiment of the present invention is illustrated. The alternative embodiment is the same as the embodiment shown in FIG. 3 except that the OR-ing diodes are implemented using N-channel MOSFETs 42a, 42b, 42c, and 42d for ease of implementation in a silicon die.

Figure 5:
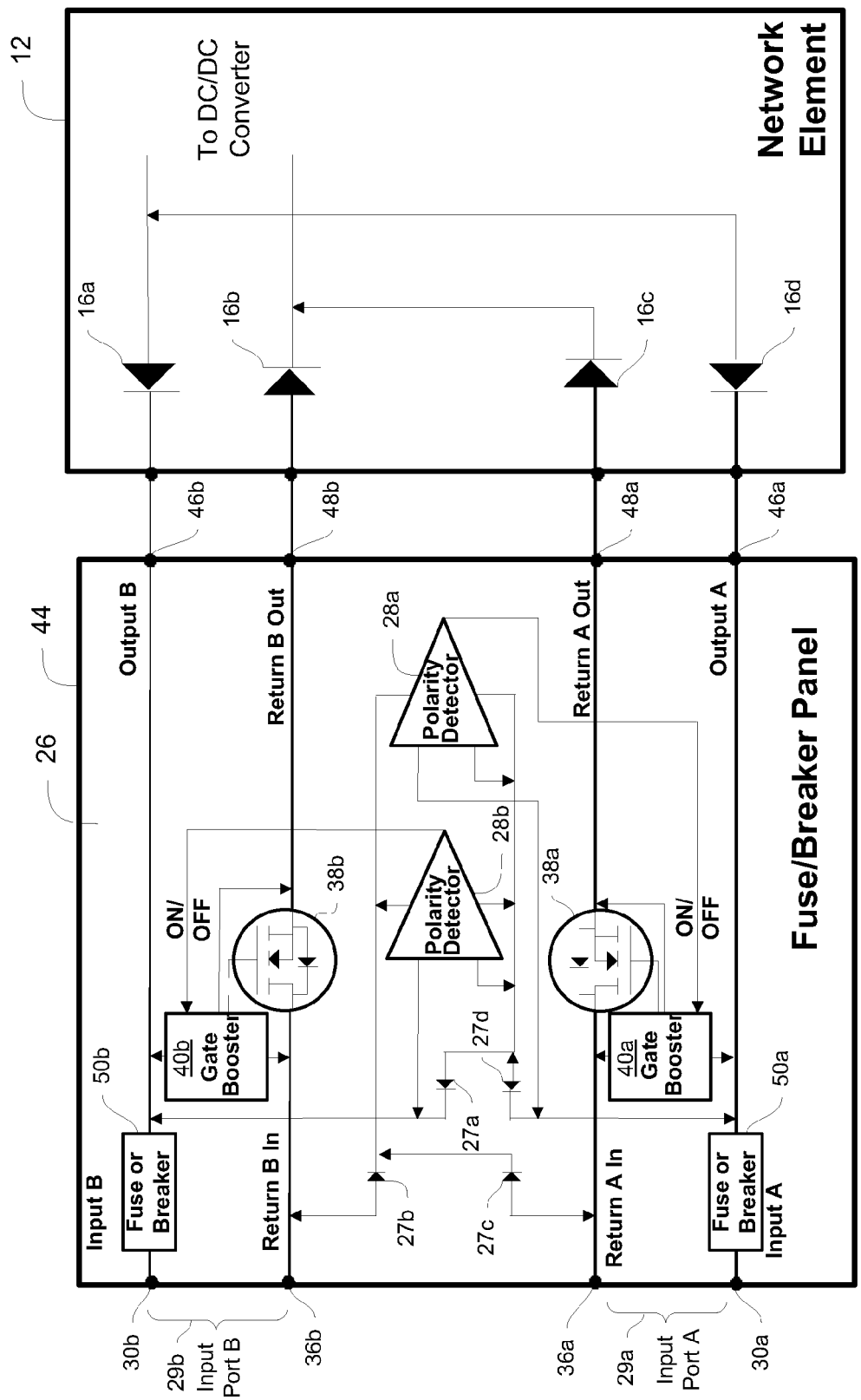
FIG. 5 is a block diagram of an exemplary BRD circuit embedded in a fuse/breaker panel for use with network elements containing integrated OR-ing diodes, constructed in accordance with the principles of the present invention.

Referring now to FIG. 5, an alternative embodiment of the present invention is illustrated in which the battery return disconnect circuit 26 is implemented external to the network element 12 as a fuse/breaker panel 44. Fuse/breaker panel 44 may be used in conjunction with pre-existing network elements 12 designed to operate from dual battery plants 14 and having OR-ing diodes 16 on the DC input and return ports. When the battery return disconnect circuit 26 is active, current from the dual power plants 14 flows through the battery return disconnect circuit 26, out the DC output terminals 46a, 46b, into the network element 12, and returns through the DC return terminals 48a, 48b.

As above, the battery return disconnect circuit 26 includes a pair of polarity detectors 28a, 28b connected across an OR-ing diode 27a, 27d that is in series with an input terminal 30a, 30b of the battery return disconnect circuit 26. Each input terminal 30a, 30b is connected to a negative terminal 32a, 32b of one of the batteries 14. The positive terminal 34a, 34b of each battery 14 is connected to a DC return 36a, 36b of the battery return disconnect circuit 26. Each DC return 36 is connected to an N-channel MOSFET 38a, 38b, which conducts current when both batteries 14 are connected across the DC inputs 30 and DC returns 36, or when the battery connected across the corresponding DC input 30 and DC return 36 is at the same or higher voltage level than a battery connected across the other DC input 30 and DC return 36. A fuse (or breaker) 50a, 50b is connected in series with each DC input terminal 30a, 30b for safety purposes. As known in the art, the fuse or breaker 50 disrupts the circuit when an excessive amount of current is detected.

The polarity detectors 28 detect when the corresponding input feed 30 is disconnected, or has a lower voltage than the other battery 14. When the polarity detector 28 is activated, its output triggers a gate booster 40a, 40b to switch the corresponding MOSFET 38 off, thereby opening the circuit path and preventing any current from flowing out the return 36.

Figure 6:
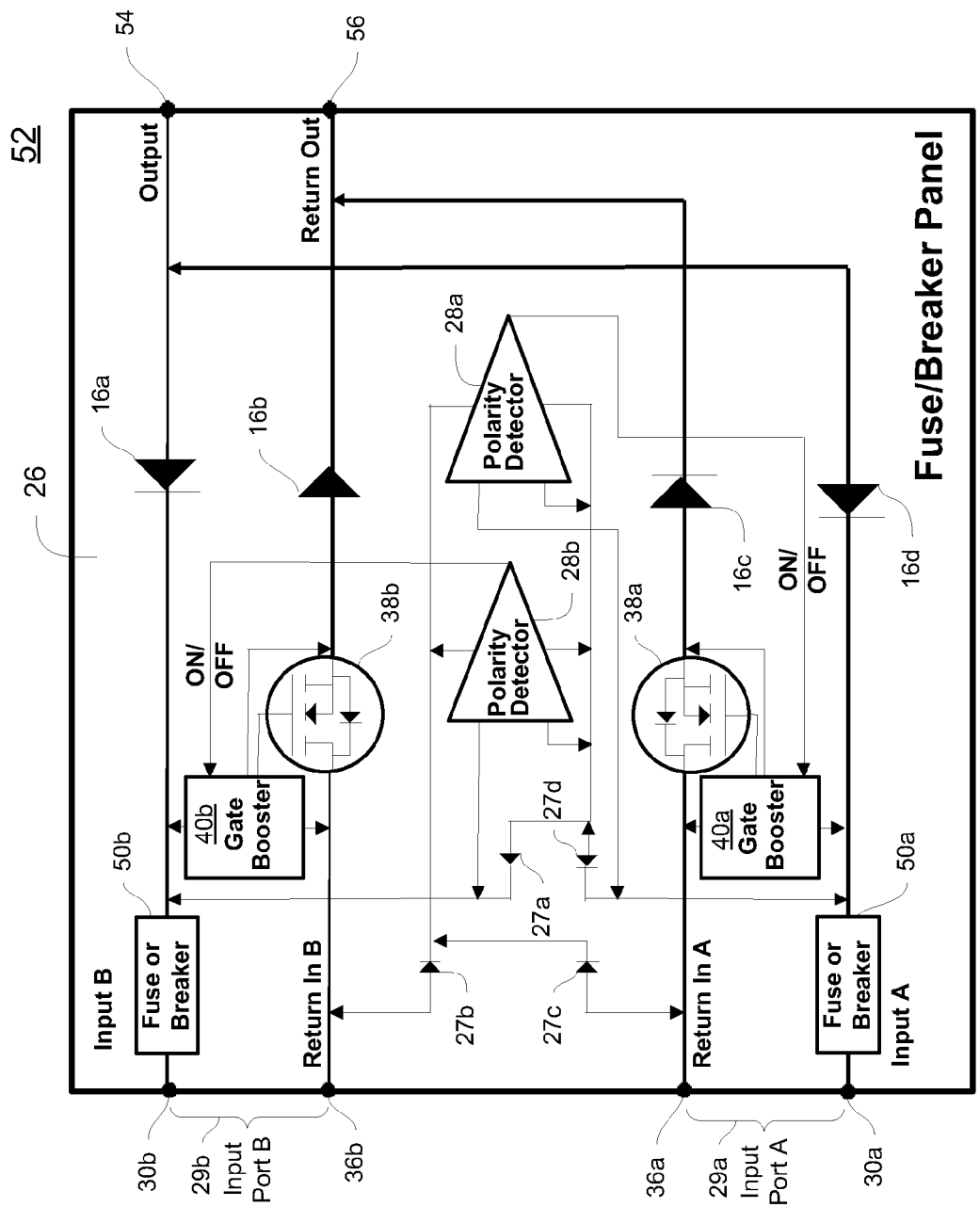
FIG. 6 is a block diagram of an exemplary BRD circuit embedded in a fuse/breaker panel for use with network elements without integrated OR-ing diodes, constructed in accordance with the principles of the present invention.

Referring now to FIG. 6, an alternative embodiment of the present invention is illustrated wherein the battery return disconnect circuit 26 is implemented external to a network element as a fuse/breaker panel 52. Fuse/breaker panel 52 may be used in conjunction with network elements designed to operate from a single battery or power plant 14. Fuse/breaker panel 52 provides network elements having a single DC input port with the benefit of having redundant battery supplies 14 such that the network element continues to operate as designed in the event that one of the batteries 14 fail. When the battery return disconnect circuit 26 is active, current from the dual power plants 14 flows through the battery return disconnect circuit 26, out the DC output terminal 54, into the network element 12, and returns through a single DC return terminal 56.

The battery return disconnect circuit 26 of FIG. 6 is identical to the battery return disconnect circuit 26 discussed above in relation to FIG. 5, except that the OR-ing diodes 16 of the network element 12 are integrated into the fuse/breaker panel 52, allowing the battery return disconnect circuit 26 to be used when the network element 12 has a single DC input port.

Unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A battery return disconnect circuit for use with a battery supply having a plurality of electrically parallel interconnecting batteries, the battery return disconnect circuit comprising:
   a plurality of DC input ports, each DC input port connectable to a corresponding one of the batteries and including:
      a DC input terminal; and
      a DC return terminal;
   a set of OR-ing diodes, each OR-ing diode of the set of OR-ing diodes electrically connected in series with one of a corresponding DC input terminal and a corresponding DC return terminal such that each OR-ing diode is forward-biased to conduct current when the battery return disconnect circuit is connected to the plurality of batteries and the batteries are at substantially the same voltage;

a plurality of polarity detectors, each polarity detector monitoring the bias of an OR-ing diode electrically connected to a corresponding DC input terminal; and a plurality of switches, each switch electrically connected in series with a DC return terminal and electrically coupled to a polarity detector, each switch operating in a closed position when the corresponding polarity detector determines that its monitored OR-ing diode is forward-biased and operating in an open position when the corresponding polarity detector determines that its monitored OR-ing diode is reverse-biased.

2. The battery return disconnect circuit of claim 1, wherein the battery return disconnect circuit is electrically connected to a plurality of batteries, each battery connected to one of the DC input ports; and wherein an OR-ing diode electrically connected to a DC input terminal is reverse-biased when the DC input terminal is disconnected from its corresponding battery.

3. The battery return disconnect circuit of claim 1, wherein the battery return disconnect circuit is electrically connected to a plurality of batteries, each battery connected to one of the DC input ports; and wherein an OR-ing diode connected to a DC input terminal is reverse-biased when the battery connected to its corresponding DC input port has a voltage level less than a voltage level of the other battery.

4. The battery return disconnect circuit of claim 1, wherein each polarity detector is an op-amp comparator.

5. The battery return disconnect circuit of claim 1, wherein each switch is a MOSFET device.

6. The battery return disconnect circuit of claim 5, wherein each OR-ing diode is a MOSFET device.

7. The battery return disconnect circuit of claim 5, further comprising a plurality of gate boosters electrically connected between an output of each polarity detector and its corresponding switch, each gate booster operable to open the corresponding switch when the corresponding polarity detector determines that its monitored OR-ing diode is reverse-biased.

8. The battery return disconnect circuit of claim 1, further comprising a chassis ground connectable to a vertical building riser.

9. The battery return disconnect circuit of claim 1, wherein each polarity detector monitors the bias of an OR-ing diode electrically connected to a corresponding DC input terminal by measuring a voltage drop across the OR-ing diode.

10. A fuse/breaker panel for use with a battery supply having a plurality of electrically parallel interconnecting batteries, the fuse/breaker panel comprising:

a plurality of DC input ports, each DC input port connectable to a corresponding one of the batteries and including:
  a DC input terminal; and
  a DC return terminal;
one of a plurality of breakers and a plurality of fuses directly connected to the plurality of DC input ports; and
a battery return disconnect circuit electrically connected to the plurality of DC input ports, the battery return disconnect circuit including:
  a set of OR-ing diodes, each OR-ing diode of the set of OR-ing diodes electrically connected in series with one of a corresponding DC input terminal and a corresponding DC return terminal such that each OR-ing diode is forward-biased to conduct current when the battery return disconnect circuit is connected to the plurality of batteries and the batteries are at substantially the same voltage level;

a plurality of polarity detectors, each polarity detector monitoring the bias of an OR-ing diode electrically connected to a corresponding DC input terminal; and a plurality of switches, each switch electrically connected in series with a DC return terminal and electrically coupled to a polarity detector, each switch operating in a closed position when the corresponding polarity detector determines that its monitored OR-ing diode is forward-biased and operating in an open position when the corresponding polarity detector determines that its monitored OR-ing diode is reverse-biased.

11. The fuse/breaker panel of claim 10, wherein each polarity detector is an op-amp comparator.

12. The fuse/breaker panel of claim 10, wherein each switch is a MOSFET device.

13. The fuse/breaker panel of claim 12, wherein each OR-ing diode is a MOSFET device.

14. The fuse/breaker panel of claim 12, wherein the battery return disconnect circuit further comprises a plurality of gate boosters electrically connected between an output of each polarity detector and its corresponding switch, each gate booster operable to open the corresponding switch when the corresponding polarity detector determines that its monitored OR-ing diode is reverse-biased.

15. The fuse/breaker panel of claim 10, further comprising a plurality of output DC ports.

16. The fuse/breaker panel of claim 10, further comprising a single output DC port.

17. A method for preventing current flow through a DC return port of a device powered by a battery supply, the device having a plurality of DC input ports, each DC input port connectable to one of the batteries and each DC input port including a DC input terminal and a DC return terminal, the battery supply having a plurality of electrically parallel interconnecting batteries, the method comprising:

electrically connecting a battery return disconnect circuit between the battery supply and the plurality of DC input ports, the battery disconnect circuit including a set of OR-ing diodes electrically connected to a corresponding DC input terminal, a plurality of polarity detectors, and a plurality of switches electrically connected to a corresponding DC input terminal;

monitoring a bias of an OR-ing diode electrically connected to a corresponding DC input terminal; and responsive to determining that the monitored OR-ing diode is reverse-biased, switching one of the switches electrically connected to a corresponding DC return terminal to an open position.

18. The method of claim 17, wherein each OR-ing diode of the set of OR-ing diodes electrically connected in series with one of a corresponding DC input terminal and a corresponding DC return terminal such that each OR-ing diode is forward-biased to conduct current when the battery return disconnect circuit is connected to the plurality of batteries and the batteries are at substantially the same voltage level.

19. The method of claim 17, wherein each polarity detector monitors the bias of an OR-ing diode electrically connected to a corresponding DC input terminal by measuring a voltage drop across the OR-ing diode.

20. The method of claim 17, further comprising, responsive to determining that the monitored OR-ing diode is reverse-biased, operating one of the switches electrically connected to a corresponding DC return terminal in a closed position.

* * * * *